(12) United States Patent
Montaner Gutierrez et al.

(10) Patent No.: US 8,175,589 B2
(45) Date of Patent: May 8, 2012

(54) METHOD FOR SIM CARD REPLACEMENT (75) Inventors: Javier Montaner Gutierrez, Madrid (ES); Miguel Angel Touset Rios, Madrid (ES); Jose Carlos Sendra Alcina, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 4 days.

(21) Appl. No.: 12/827,175

(22) Filed: Jun. 30, 2010

(65) Prior Publication Data
US 2011/0053579 A1   Mar. 3, 2011

(30) Foreign Application Priority Data
Jun. 30, 2009   (ES) .................................. 200930379

(51) Int. Cl.
*H04W 4/00* (2009.01)

(52) U.S. Cl. ..................... 455/418; 455/556.1; 455/558; 455/559

(58) Field of Classification Search .................. 455/558, 455/559, 418, 556.1
See application file for complete search history.

(56) References Cited

U.S. PATENT DOCUMENTS

| 5,943,620 | A | 8/1999 | Boltz et al. |
| 2005/0025300 | A1 | 2/2005 | Lagadec et al. |
| 2005/0075137 | A1 | 4/2005 | Reemtsma |
| 2006/0063564 | A1 | 3/2006 | Sharma |
| 2007/0191011 | A1* | 8/2007 | Jiang .............................. 455/436 |

FOREIGN PATENT DOCUMENTS

| WO | WO-92/19078 | 10/1992 |
| WO | WO 2006/122871 | 11/2006 |
| WO | WO-2007/089821 | 8/2007 |

* cited by examiner

*Primary Examiner* — Pierre-Louis Desir
(74) *Attorney, Agent, or Firm* — B. Aaron Schulman, Esq.; Terry L. Wright, Esq.; Stites & Harbison, PLLC (57) ABSTRACT

Method for SIM card replacement, aimed to obtain the functionality of a first SIM card storing a real IMSI number associated to a real MSISDN ($MSISDN_{rA}$, $MSISDN_{rB}$), the method comprising:
  providing a user with a replacement SIM card storing a fake IMSI number ($IMSI_{fA}$, $IMSI_{fB}$);
  associating the fake IMSI number ($IMSI_{fA}$, $IMSI_{fB}$) with a fake MSISDN ($MSISDN_{fA}$, $MSISDN_{fB}$);
  setting unconditional call forwarding of all incoming calls aimed to the real MSISDN ($MSISDN_{rB}$) to the fake MSISDN ($MSISDN_{fB}$);
  for each call originated from a calling mobile station ($1a_f$) using a replacement SIM card, replacing the calling party number ($MSISDN_{fA}$) with the real MSISDN ($MSISDN_{rA}$).

8 Claims, 5 Drawing Sheets

METHOD FOR SIM CARD REPLACEMENT

FIELD OF THE INVENTION

The present invention is comprised within the field of mobile telecommunications, and more specifically in a method for replacing a stolen/forgotten SIM card for a new one with the same functionality.

BACKGROUND OF THE INVENTION

The present invention can be used when a user forgets, loses or gets his handset stolen.

For forgotten handsets, call forwarding is standardized, but the user needs to get/borrow a new handset/subscription MSISDN until he/she recovers his/her handset/SIM. He also needs somebody with access to his forgotten handset to manually do the call forwarding process towards the new handset/MSISDN. For outgoing calls, there is no known solution. The user can make calls from his new handset, but receivers will see a different number/MSISDN, not his own.

Document US2006063564 discloses a method for retention of old mobile number on SIM card replacement. It is a SIM OTA based solution to replace one SIM card with another one. The OTA channel is used to update the subscriber data (IMSI/Ki) of the new SIM with the values of the old SIM. However, in this solution the old SIM cannot be reused afterwards (once the user recovers his lost/forgotten SIM), it cannot be activated again.

Document WO2006122871 discloses a method for automatically replacing a user identifying module in a terminal. It describes a solution to replace a SIM card by another one, by replacing its data in the HLR. However, the undo scenario to return to the initial situation (the user recovers his old SIM and can reuse it again) is not supported.

Document U.S. Pat. No. 5,943,620 discloses a method for associating one directory number with two mobile stations within a mobile telecommunications network. It is a HLR based method (non-standard) for keeping two active SIMS associated to one MSISDN number. Although it could be used for SIM replacement (define the replacement SIM as the primary SIM and never try to redirect calls to the lost/replaced SIM), the recovery back to the initial scenario is not described.

Document US2005075137 discloses a method for simplifying the exchange of a SIM card of subscribers of a digital mobile communications network. Again, this is a one-way SIM replacement; the recovery back to the initial scenario is not described.

The present invention provides a solution of all the described problems, offering a solution based on IN or IMS and supporting the recovery back to the initial scenario, when the user recovers his old SIM and can reuse it again.

It is well-known that abbreviations and acronyms are frequently used in the mobile telephony field. Below is a glossary of acronyms/terms used throughout the present specification:
AS Application Server
HLR Home Location Register
HSS Home Subscriber Server
IAM Initial Address Message
IMS IP Multimedia Subsystem
IMSI International Mobile Subscriber Identity
IN Intelligent Network
ISUP ISDN User Part
MNO Mobile Network Operator
MO Mobile Originated
MSC Mobile Switching Centre
MSISDN Mobile Station International Subscriber Directory Number
MSS MSC Server
MT Mobile Terminated
PLMN Public Land Mobile Network
SCP Service Control Point
S-CSCF Serving Call Session Control Function
SDP Service Data Point
SIP Session Initiation Protocol
SMS Short Message Service
SMSC SMS Centre
STP Signal Transfer Point
USSD Unstructured Supplementary Services Data

DESCRIPTION OF THE INVENTION

The invention relates to a method for SIM card replacement according to claim 1. Preferred embodiments of the system and of the method are defined in the dependent claims.

The present method is aimed to obtain the functionality of a first SIM card storing a real IMSI number associated to a real MSISDN. The method comprises:
  providing a user with a replacement SIM card storing a fake IMSI number;
  associating the fake IMSI number with a fake MSISDN;
  setting unconditional call forwarding of all incoming calls aimed to the real MSISDN to the fake MSISDN;
  for each call originated from a calling mobile station using a replacement SIM card, replacing the calling party number with the real MSISDN.

The setting of unconditional call forwarding of all incoming calls aimed to the real MSISDN to the fake MSISDN can be established by sending, from a server which has previously authenticated the user of the replacement SIM card, an OTA command to the first SIM card to force the call forwarding.

The method can further comprise defining a Mobile Originated IN service associated to the fake MSISDN to determine its associated real MSISDN; and in that case the replacement of the calling party number, for each call originated from a calling mobile station using a replacement SIM card, with the real MSISDN can be carried out by:
  checking if the fake MSISDN of said calling mobile station has a Mobile Originated IN service, and in that case using said Mobile Originated IN service to:
    obtain the real MSISDN;
    replace the calling party number with the real MSISDN.
The method can also comprise:
  defining in all the S-CSCF a trigger rule to determine the AS associated to the fake MSISDN;
  determining in said AS the real MSISDN associated to the fake MSISDN; and the replacement of the calling party number with the real MSISDN, for each call originated from a calling mobile station using a replacement SIM card, can be carried out by:
  obtaining from the mobile station an ISUP IAM message with the calling party number and the destination number;
  converting the IAM message into a SIP message;
  sending said SIP message to a S-CSCF;
  obtaining, by means of the defined trigger rule, the AS associated with the calling party number;
  obtaining the real MSISDN associated to the fake MSISDN;
  replacing the calling party number, with the real MSISDN.
The method can further comprise disabling the first SIM card.

The method preferably comprises for each SMS originated from a mobile station using a replacement SIM card, replacing the sender number with the real MSISDN.

The method can also comprise defining an SMS service associated to the fake MSISDN to determine its associated real MSISDN; and in that case the replacement of the sender number, for each SMS originated from a mobile station using a replacement SIM card, with the real MSISDN is carried out by:
 checking if the fake MSISDN of said mobile station has an SMS added-value service, and in that case using said SMS added-value service to:
  obtain the real MSISDN;
  replace the sender number with the real MSISDN.

The method can further comprise, for each SMS aimed to the real MSISDN, replacing the destination number with the fake MSISDN.

The method preferably comprises defining an SMS service associated to the real MSISDN to determine its associated fake MSISDN; and in that case the replacement of the destination number, for each SMS aimed to the real MSISDN, with the fake MSISDN can be carried out by:
 checking if the real MSISDN has an SMS added-value service, and in that case using said SMS service to:
  obtain the fake MSISDN;
  replace the destination number with the fake MSISDN.

BRIEF DESCRIPTION OF THE DRAWINGS

A series of drawings which aid in better understanding the invention and which are expressly related with an embodiment of said invention, presented as a non-limiting example thereof, are very briefly described below.

DESCRIPTION OF A PREFERRED
EMBODIMENT OF THE INVENTION

The present invention implements "replacement SIM cards", which are SIMs provisioned in the network (HLR) and active (they can make calls).

When a user forgets/loses his handset/SIM, he/she can go to a point of sale (PoS) to identify himself. He is then given a replacement SIM card. The MNO personnel at the PoS starts also a network process to forward all incoming calls aimed to the user's mobile number (MSISDN) to the new replacement SIM. From this moment all incoming calls to the user's MSISDN will be received by the replacement SIM (in fact the handset where the replacement SIM is inserted). The user will not lose any incoming call.

For originating calls, an intelligent network (IN) or IMS solution can be implemented to include the user's MSISDN as the originator of the call. This means that the user can also make calls straight away as if he/she was using his/her real handset/SIM and the receivers will not observe any difference (they will see the user's MSISDN when receiving calls from the replacement SIM).

In the network all the charging events associated with the replacement SIM will need to be associated to the user's subscription (his real SIM).

Additionally, the real SIM of the user can be disabled temporarily or permanently in the network to avoid that it can be used (important in the case of stolen/lost SIM) by other people. When the user recovers his SIM the mechanism is rolled back in the network: the replacement SIM is disabled, the call forwarding is removed from his MSISDN and the real SIM is enabled again. The user keeps on having the same service as he used to have.

It is also possible not to make use of the network of PoS to allow the call forwarding. The alternative is that the user using the replacement SIM could connect to a server in the new MNO with the purpose of authenticating the user (autoregistering). When the user is authenticated, the server can send to OTA SIM Platform a command to force the real SIM to send a call forwarding to the MSISDN.

A second use of the present invention is to improve user experience when porting his mobile number from one MNO to another.

When the user requests number portability at the PoS, the user is given a replacement SIM of the new MNO and he is told to set call forwarding of all his incoming calls in the network of the old MNO to an MSISDN of the new MNO. The new MNO has a pool of MSISDNs reserved for this purpose. The selected number is internally forwarded again to the replacement SIM given to the user (mechanism described above). Note that this second call-forward happens internally in the network of the new MNO so it is transparent to the old MNO.

Thus, from the very moment that the user requests the call-forwarding, the user can start using the SIM of the new operator.

The user has normally to pay the call forwarding of all his incoming calls from old to new operator. To avoid this overhead, the new MNO could have a pool of SIMs of the old MNO (internal call forwarding is much cheaper) and the new MNO should then cover the cost of these MSISDNs in the old MNO (and the associated call forwarding cost to his network in an additional step).

For outgoing calls, the new MNO could start offering its own tariffs and let the new user keep using his MSISDN.

Mobile Originated Call (IN)

Figure 1:
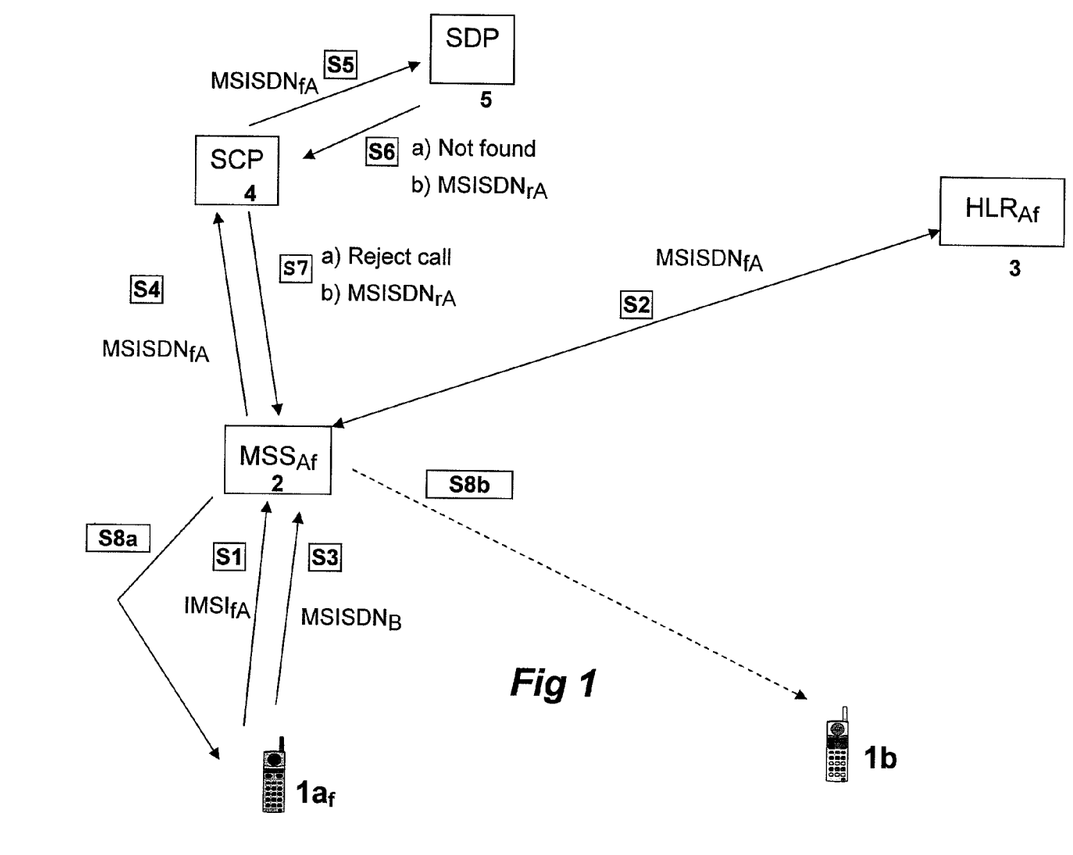
FIG. 1 shows the steps of mobile originated calls according to the IN solution.

FIG. 1 shows the steps of a mobile originated call according to the IN solution.

S1. The mobile station $1a_f$ is switched on and starts the IMSI Attach mechanism with the MSS 2 (in 3G, also known as MSC in 2G). The fake IMSI ($IMSI_{fA}$) is passed to the MSS 2.

S2. The MSS 2 contacts the HLR 3 and after some standard interactions among the mobile station $1a_f$, the MSS 2 and the HLR 3, the MSS 2 receives the $MSISDN_{fA}$ associated to $IMSI_{fA}$. It also informs the MSS 2 that $IMSI_{fA}$ has also one IN service associated to originating calls.

S3. When the mobile station $1a_f$ sets up a call, it informs the MSS 2 of the destination number $MSISDN_B$.

S4. MSS 2 sees that the calling party, $IMSI_{fA}/MSISDN_{fA}$, has one IN service defined and passes the call request to the SCP 4.

S5. The SCP 4 goes to SDP 5 (a kind of database) to check the configuration of the IN service for $MSISDN_{fA}$.

S6. a) If $MSISDN_{fA}$ is not found, SDP 5 answers that $MSISDN_{fA}$ is not defined in SDP 5 or $MSISDN_{fA}$ has no real MSISDN associated in SDP 5.

b) If $MSISDN_{fA}$ is found, SDP answers with an associated real $MSISDN_{rA}$

S7. a) In MSISDN$_{fA}$ was not found, SCP 4 informs the MSS 2 that the call must be rejected since this fake IMSI$_{fA}$ is not active.
b) If MSISDN$_{fA}$ was found, SCP 4 informs MSS 2 to change the originating number for this call from MSISDN$_{fA}$ to MSISDN$_{rA}$. This way the called party (MSISDN$_B$) will receive the call with the real number of the user of the calling mobile station 1$a_f$ and not the fake number contained in the SIM card.

S8. a) If MSISDN$_{fA}$ was not found, the call is rejected.
b) If MSISDN$_{fA}$ was found, the call continues as a standard mobile originated call, reaching the called party 1$b$.

Mobile Terminated Call

Figure 2:
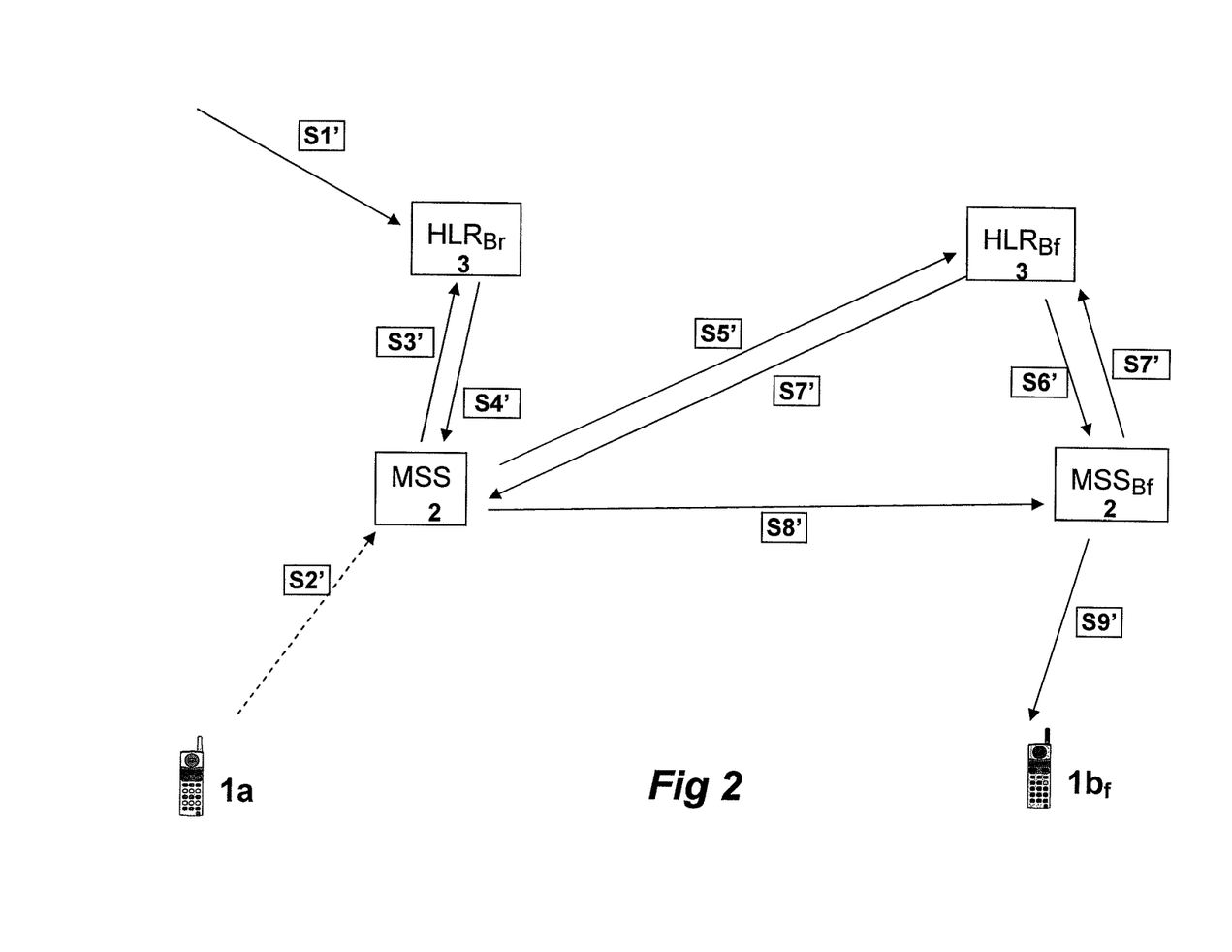
FIG. 2 shows the steps of mobile terminated calls.

FIG. 2 shows the steps of a mobile terminated call.

S1'. When the fake SIM is associated to the number of the user, the unconditional call forward service is activated to redirect all incoming calls aimed to number MSISDN$_{rB}$ to number MSISDN$_{fB}$. This mechanism is activated in the HLR, HLR$_{Bf}$, and can be initiated through USSD or other mechanisms in the network.

S2'. The calling party 1$a$ calls MSISDN$_{rB}$. The call enters the network of the operator through a gateway MSS if the call is originated in another operator or from one internal MSS 2 if the call is originated from the operator itself. In both cases the same mechanism is applied.

S3'. The MSS 2 contacts the HLR responsible for MSISDN$_{rB}$ to know its current location/serving MSS, asking for MSISDN$_{rB}$ routing info.

S4'. Since MSISDN$_{rB}$ has unconditional call forwarding defined, the HLR informs the MSS that the call should be redirected to the fake MSISDN$_{fB}$.

S5'. The MSS 2 contacts the HLR responsible for MSISDN$_{fB}$, HLR$_{Bf}$, to know the current location/MSS of the called party 1$b'$, and from this point (Steps 5,6,7,8), the standard mechanism for mobile terminated call set up is followed. The call finally reaches the called party 1$b_f$.

Mobile Originated SMS (IN)

Figure 3:
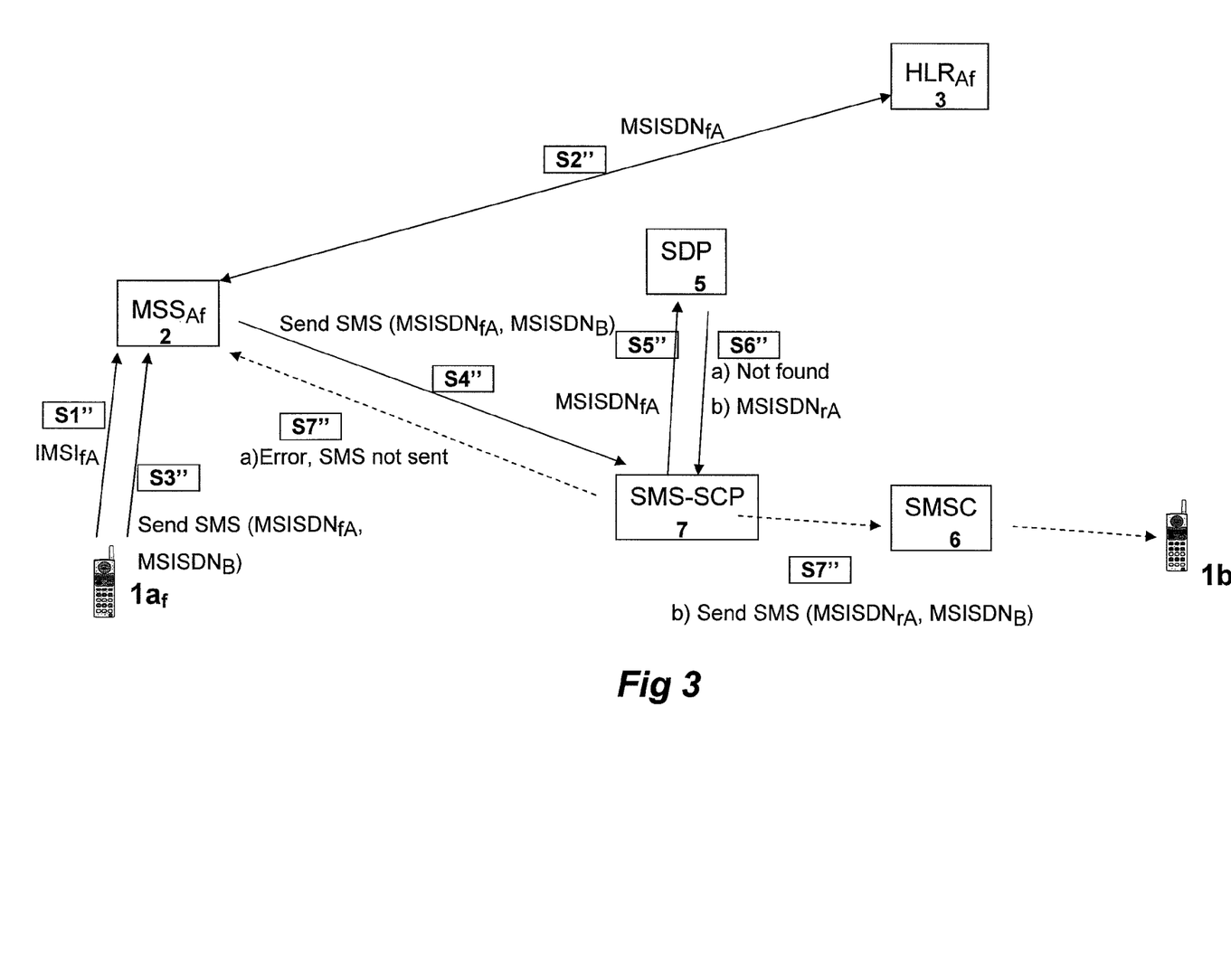
FIG. 3 shows the steps of a mobile originated SMS according to the IN solution.

FIG. 3 shows the steps of a mobile originated SMS according to the IN solution.

S1". The mobile station 1$a_f$ is switched on and starts the IMSI Attach mechanism with the MSS 2 (3G, also know as MSC in 2G). The fake IMSI (IMSI$_{fA}$) is passed to the MSS 2.

S2". The MSS 2 contacts the HLR 3 and after some standard interactions among the mobile station 1$a_f$, the MSS 2 and the HLR 3, the MSS 2 receives the MSISDN$_{fA}$ associated to IMSI$_{fA}$.

S3". When the mobile station 1$a_f$ wants to send an SMS, it forwards it to the MSS 2 including the destination number MSISDN$_B$ and the SMSC 6.

S4". There is an intermediate server 7, Short Message Service—Service Control Point (SMS-SCP), in the network between the real SMSC 6 and the MSS 2. From the MSS perspective this is transparent since it is using the standard protocol that it would use with a real SMSC. The intermediate server 7 is a new element used by the present invention.

S5". When the "Send SMS" request is received from the MSS (including sender MSISDN$_{fA}$ and receiver MSISDN$_B$), the server SMS-SCP 7 checks in the SDP 5 (the same element used for mobile originated calls) the configuration of the SMS added-value service for MSISDN$_{fA}$.

S6". a) If IMSI$_{fA}$ is not found, SDP 5 answers that MSISDN$_{fA}$ is defined in SDP 5 but MSISDN$_{fA}$ has no real MSISDN associated in SDP.
b) If IMSI$_{fA}$ is found, SDP detects MSISDN$_{fA}$ is defined in its database and answers with its associated real MSISDN$_{rA}$.

S7". a) If IMSI$_{fA}$ is not active, SMS-SCP informs the MSS that the SMS cannot be sent since this fake IMSI$_{fA}$ is not active.
b) If IMSI$_{fA}$ is found, SMS-SCP updates the sender to MSISDN$_{rA}$ and forwards the request to the real SMSC 6. From this point, the protocol continues as a standard mobile originated SMS and SMS-SCP 7 will act only as a proxy of the messages exchanged between SMSC 6 and MSS 2. The SMS finally reaches the mobile station 1$b$.

Mobile Terminated SMS (IN)

Figure 4:
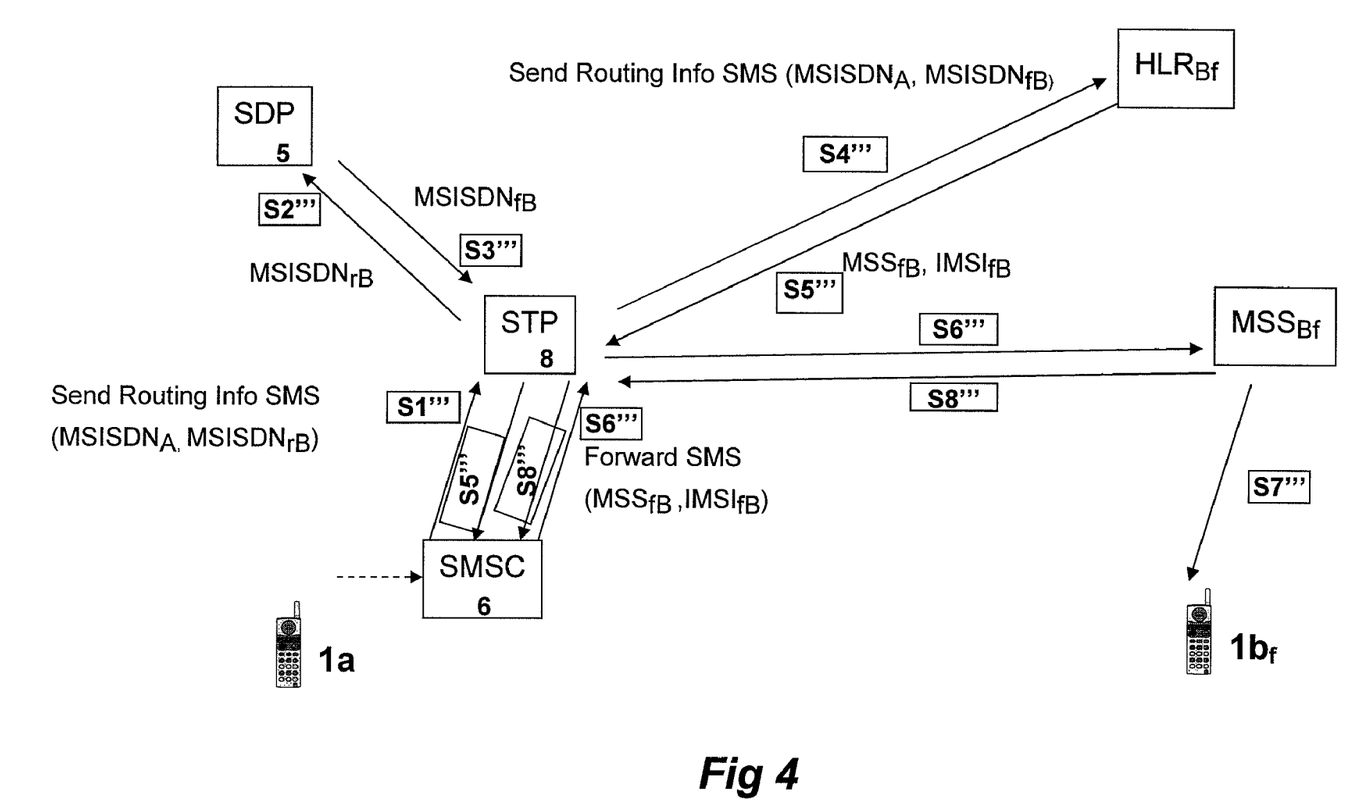
FIG. 4 shows the steps of a mobile terminated SMS according to the IN solution.

FIG. 4 shows the steps of a mobile terminated SMS according to the IN solution, wherein the SMSC is in a Visited PLMN.

S1'''. The SMSC 6 sends a Send_Routing_Info_for_Short_Message message using the MSISDN$_{rB}$. This MSISDN number is used to route this message to an STP node 8 (Signal Transfer Node) in the network of the called party 1$b_f$.

S2'''. The STP 8 contacts an external node, SDP 5, to translate the MSISDN$_{rB}$ to an MSISDN$_{fB}$.

S3'''. The STP 8 receives the MSISDN$_{fB}$ from the SDP 5.

S4'''. Moreover the STP 8, using internal tables, looks up the HLR$_{Bf}$ to relay the previous message.

S5'''. The HLR$_{fB}$ sends a Send_Routing_Info_for_Short_Message response to the SMSC 6 including the IMSI$_{fB}$ and the network number of the MSS, MSS$_{fB}$, where the mobile station 1$b_f$ is located.

S6'''. The SMSC 6 sends a MT_Forward_Short_Message message to MSS where the mobile station 1$b_f$ is located using the MSS$_{fB}$ and IMSI$_{fB}$.

S7'''. The SMS is delivered.

S8'''. The SMSC 6 receives a MT_Forward_Short_Message response message with the delivery status.

If the message is not delivered, then the SMSC 6 sends a REPORT_SM_DELIVERY STATUS message to the HLR$_{Bf}$ including the MSISDN$_{rB}$ which is processed by the STP 8 as the Send_Routing_Info_for_Short_Message message. The HLR$_{Bf}$ will inform the SMSC with a standard Alert message to try again the delivery of the short message using the procedure described (steps S1''' to S8''').

Mobile Originated Call (IMS)

It is worth describing in some detail, for this IMS solution, what happens with the user when he/she contacts with the Point of Sales and receives a "replacement SIM card" which is linked to a fake MSISDN.

It is assumed that the user is an IMS user, which means that there is a provisioning record in the HSS linked to the public SIP identity of the user. In an example the identity is sip: jsendra@vodafone.com, the state of the user before losing/forgetting the phone is Registered and the user has associated telephone identities already registered as well (implicit registration), for example, tel:+34610513503, which is the real MSISDN associated to the user.

From this point onwards, there can be two possible scenarios:

Scenario 1: The fake MSISDN has some common and recognizable numbers.

Figure 5:
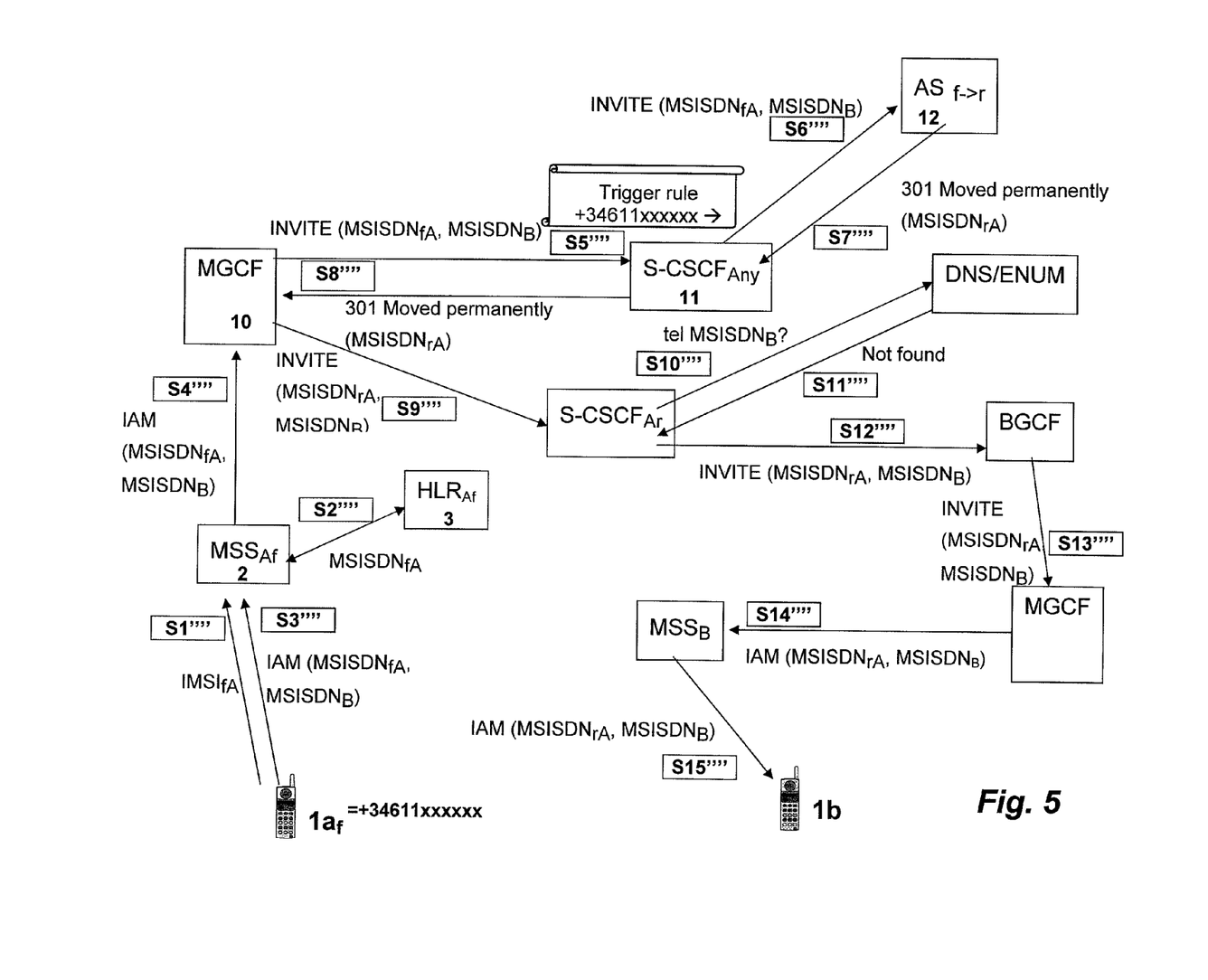
FIG. 5 shows the steps of mobile originated calls according to the IMS solution.

FIG. 5 shows the steps of mobile originated calls according to this scenario 1.

All the fake MSISDN linked to the replacement SIM cards can start, for instance, with the prefix +34611xxxxxx. This simplifies the trigger rules in all the S-CSCF which can have a common rule, close to a default or wildcard rule, to those numbers that forwards the call to any specific AS (Application Server). The MNO personnel at the PoS must access to that AS after delivering the replacement SIM and links the fake MSISDN to the real MSISDN. The detailed sequence of events is described:

S1"". The mobile station $1a_f$ is switched on and starts the IMSI Attach mechanism with the MSS (3G, also know as MSC in 2G). The fake IMSI ($IMSI_{fA}$) is passed to the MSS.

S2"". The MSS contacts the HLR and after some standard interactions among the mobile station $1a_f$, the MSS 2 and the HLR 3, the MSS 2 receives the $MSISDN_{fA}$ associated to $IMSI_{fA}$. This fake MSISDN belongs to the wildcard range +34611xxxxxx.

S3"". When the mobile station $1a_f$ sets up a call, it issues an ISUP IAM message towards the MSS with the following information:
Calling party number: $MSISDN_{fA}$
Called or destination number: $MSISDN_B$ S4"". The network intelligence is in the IMS network, therefore the MSS 2 has to contact with an MGCF 10 (Media Gateway Control Function)

The MGCF 10 translates the IAM message to a SIP message (INVITE) with the following mapping:
Calling party number→P-Asserted-Id=tel: $MSISDN_{fA}$
Called party number→Request-URI=tel: $MSISDN_B$ S5"". The MGCF forwards the INVITE message to the S-CSCF responsible of the user present in the P-Asserted-Id header. In that case, this fake number has been not registered in IMS, but the rule defining how to manage those numbers is present in all the S-CSCF belonging to the MNO, then the MGCF decides to forward the message to the closest S-CSCF.

S6"". The contacted S-CSCF matches the P-Asserted-Id with the corresponding trigger rule and find out the AS responsible of managing the message. The S-CSCF forwards the INVITE to that AS.

S7"". In that AS, the MNO personnel has provisioned the following mapping rule: tel:$MSISDN_{fA}$→$MSISDN_{rA}$. Using that rule, the AS answers with a 301 Moved Permanently message with the $MSISDN_{rA}$ in the Contact header.

S8"". The answer gets to the MGCF 10, which proceeds accordingly.

S9"". The MGCF 10 finds out the right S-CSCF where the real MSISDN was registered. That S-CSCF proceeds as a normal SIP call leg (steps S10""-S15"").

Scenario 2: The fake MSISDN is a number assigned dinamically. No recognizable numbers can be assumed.

The MNO personnel at the PoS access the HSS after delivering the replacement SIM and add the fake MSISDN to the provisioning record of the IMS user. The trigger rule associated to that additional record must point out to an AS where the MNO personnel must also provision the mapping between the fake and the real MSISDN. The detailed sequence of events is described:

The mobile station must be also a SIP client. The SIP client must register the fake MSISDN. An S-CSCF is assigned to this registered record.

The rest of the sequence is the same as the previous scenario.

The invention claimed is:

1. A method for SIM card replacement, aimed to obtain the functionality of a first SIM card storing a real IMSI number associated to a real MSISDN, the method comprising: providing a user with a replacement SIM card storing a fake IMSI number;

associating the fake IMSI number with a fake MSISDN;

setting unconditional call forwarding of all incoming calls aimed to the real MSISDN to the fake MSISDN;

wherein the method further comprises: replacing the calling party number with the real MSISDN for each call originated from a calling mobile station using a replacement SIM card;

wherein the method further comprises:

defining in all the S-CSCF a trigger rule to determine an AS associated to the fake MSISDN;

determining, in said AS, the real MSISDN associated to the fake MSISDN;

and wherein the replacement of the calling party number with the real MSISDN, for each call originated from a calling mobile station using a replacement SIM card, is carried out by:

obtaining from the mobile station an ISUP IAM message with the calling party number and the destination number;

converting the IAM message into a SIP message; sending said SIP message to a S-CSCF;

obtaining, by means of the defined trigger rule, the AS associated with the calling party number;

obtaining the real MSISDN associated to the fake MSISDN;

replacing the calling party number, with the real MSISDN.

2. Method according to claim 1, wherein the setting of unconditional call forwarding of all incoming calls aimed to the real MSISDN to the fake MSISDN is established by:

sending an OTA command from a server that has previously authenticated the user of the replacement SIM card to the first SIM card to force the call forwarding.

3. Method according to claim 1, wherein it further comprises:

defining a Mobile Originated IN service associated to the fake MSISDN to determine its associated real MSISDN;

and wherein the replacement of the calling party number, for each call originated from a calling mobile station using a replacement SIM card, with the real MSISDN is carried out by:

checking if the fake MSISDN of said calling mobile station has a Mobile Originated IN service, and in that case using said Mobile Originated IN service to:

obtain the real MSISDN;

replace the calling party number with the real MSISDN.

4. Method according to claim 1, further comprising disabling the first SIM card.

5. Method according to claim 1, wherein it further comprises:

for each SMS originated from a mobile station: using a replacement SIM card, replacing the sender number with the real MSISDN.

6. Method according to claim 5, wherein it further comprises:
   defining an SMS added-value service associated to the fake MSISDN to determine its associated real MSISDN;
   and wherein the replacement of the sender number, for each SMS originated from a mobile station using a replacement SIM card, with the real MSISDN is carried out by:
   checking if the fake MSISDN of said mobile station has an SMS added-value service, and in that case using said SMS added-value service to:
   obtain the real MSISDN;
   replace the sender number with the real MSISDN.

7. Method according to claim 1, wherein it further comprises, for each SMS aimed to the real MSISDN, replacing the destination number with the fake MSISDN.

8. Method according to claim 1, wherein it further comprises:
   defining an SMS added-value service associated to the real MSISDN to determine its associated fake MSISDN;
   and wherein the replacement of the destination number, for each SMS aimed to the real MSISDN, with the fake MSISDN is carried out by:
   checking if the real MSISDN has an SMS added-value service, and in that case using said SMS service to:
   obtain the fake MSISDN;
   replace the destination number with the fake MSISDN.

* * * * *